United States Patent [19]

Khoja et al.

[11] 3,986,442

[45] Oct. 19, 1976

[54] DRIVE SYSTEM FOR A CENTRIFUGAL LIQUID PROCESSING SYSTEM

[75] Inventors: Mirza A. Khoja, Washington, D.C.; George M. Coker, Jr., Silver Spring, Md.

[73] Assignee: Baxter Laboratories, Inc., Deerfield, Ill.

[22] Filed: Oct. 9, 1975

[21] Appl. No.: 620,991

[52] U.S. Cl. .................................... 74/797; 74/219

[51] Int. Cl.[2] ........................ F16H 1/28; F16H 7/00

[58] Field of Search ........ 74/797 CL, 750 R, 219 X, 74/689

[56] References Cited

UNITED STATES PATENTS

| | | | |
|---|---|---|---|
| 2,559,299 | 7/1951 | Helling | 74/797 X |
| 3,115,795 | 12/1963 | Morin | 74/797 |
| 3,842,685 | 10/1974 | Philpott et al. | 74/750 R |

*Primary Examiner*—Leonard H. Gerin
*Attorney, Agent, or Firm*—Eugene M. Cummings; Richard G. Kinney

[57] ABSTRACT

A drive system for a centrifugal liquid processing apparatus or the like wherein a rotor assembly having a container for receiving a liquid to be processed by centrifugation is rotatably mounted on a rotor drive assembly, which in turn is rotatably mounted to a stationary base. Liquid communication is maintained with the container during rotation of the rotor by means of a flexible umbilical cable which extends from the container to a location external to the apparatus by way of a passageway provided in the support shaft of the rotor assembly and a guide sleeve carried on and rotatably mounted to the rotor drive assembly. The rotor assembly is rotatably driven in the same direction as the rotor drive assembly with a speed ratio of 2:1 and the guide sleeve is rotatably driven in the opposite direction with a speed equal to that of the rotor drive assembly to prevent the umbilical cable from becoming twisted during operation of the apparatus. This is accomplished by a novel drive arrangement which includes a planetary drive gear on the rotor drive assembly which is rotatably coupled to the rotor and guide sleeve by means of a single drive belt.

8 Claims, 4 Drawing Figures

DRIVE SYSTEM FOR A CENTRIFUGAL LIQUID PROCESSING SYSTEM

BACKGROUND OF THE INVENTION

The present invention is directed generally to drive systems and apparatus, and more particularly to a drive system for a rotating terminal.

Centrifugal liquid processing systems, wherein a liquid having a suspended mass therein is subjected to centrifugal forces to obtain separation of the suspended mass, have found application in a wide variety of fields. For example, in recent years the long term storage of human blood has been accomplished by separating out the plasma component of the blood and freezing the remaining red blood cell component in a liquid medium such as glycerol. Prior to use the glycerolized red blood cells are thawed and pumped into the centrifugating wash chamber of a centrifugal liquid processing apparatus where, while being held in place by centrifugation, they are washed with a saline solution which displaces the glycerol preservative. The resulting reconstituted blood is then removed from the wash chamber and packaged for use.

The aforedescribed blood conditioning process, like other processes wherein a liquid is caused to flow through a suspended mass under centrifugation, necessitates the transfer of solutions into and out of the rotating wash chamber while the chamber is in motion. In the case of the aforedescribed blood processing operation, glycerolized red blood cell and saline solution are passed into the wash chamber, and waste and reconstituted blood solutions are passed from the chamber. To avoid contamination of these solutions, or exposure of persons involved in the processing operation to the solutions, the transfer operations are preferably carried out within a sealed flow system, preferably formed of a flexible plastic or similar material which can be disposed of after each use.

One centrifugal processing system particularly well adapted for such use is that described and claimed in the co-pending applications of Houshang Lolachi, Ser. Nos. 657,187 and 657,186, filed Feb. 11, 1976, which are continuation-in-part applications of Ser. Nos. 562,748 and 562,749, filed on Mar. 27, 1975, respectively and assigned to the present assignee. This system, which encompasses the application of the principle of operation of apparatus described in U.S. Pat. No. 3,568,413 to Dale A. Adams, establishes fluid communication between a rotating chamber and stationary reservoirs through a flexible interconnecting umbilical cord without the use of rotating seals, which are expensive to manufacture and add the possibility of contamination of the blood being processed.

In one embodiment of this system a rotatably driven sleeve is provided on the end of a rotatably driven arm to guide the umbilical cord as the wash chamber rotates. To prevent the sleeve from becoming twisted, a precise rotational relationship is maintained between the wash chamber and the sleeve relative to the axis of rotation of the wash chamber, and an additional planetary rotation may be imparted to the sleeve to reduce friction between that element and the umbilical cord. The present invention is directed to a drive system for providing the necessary rotational relationship with a minimum number of additional components in the apparatus.

SUMMARY OF THE INVENTION

The invention is directed to a drive system for a rotating terminal comprising a stationary base, a rotor drive assembly rotatably mounted to the base for rotation along a predetermined axis, the rotor drive assembly including a planetary drive pulley rotatably coupled to the base so as to rotate with rotation of the rotor drive assembly, and an idler pulley, and a rotor assembly including at least one rotating terminal, the rotor assembly being rotatably mounted with respect to the base for rotation along the axis and including a rotor drive pulley. The system further comprises means including a flexible umbilical cable segment for establishing energy communication with the terminal, one end of the cable segment being fixed with respect to the base along the axis at one side of the rotor assembly, the other end of the cable segment being attached on the axis in rotationally locked engagement to the other side of the rotor assembly, and guide means including a sleeve carried on and rotatably mounted to the rotor drive assembly for causing the umbilical cable segment to rotate about the axis with the rotor drive assembly, the sleeve including a sleeve drive pulley. Apparatus drive means are provided for rotating the rotor drive assembly with respect to the base, and rotor drive means including a drive belt extending between and rotatably coupling the planetary drive pulley, the rotor drive pulley, the idler pulley, and the sleeve drive pulley are provided for rotating the rotor assembly in the same direction as the rotor drive assembly with a speed ratio of 2:1 and the sleeve in an opposite direction with a speed equal to that of the rotor drive assembly to prevent the umbilical cable from becoming twisted during rotation of the rotor.

BRIEF DESCRIPTION OF THE DRAWINGS

The features of the present invention, which are believed to be novel, are set forth with particularity in the appended claims. The invention, together with the further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Figure 1:
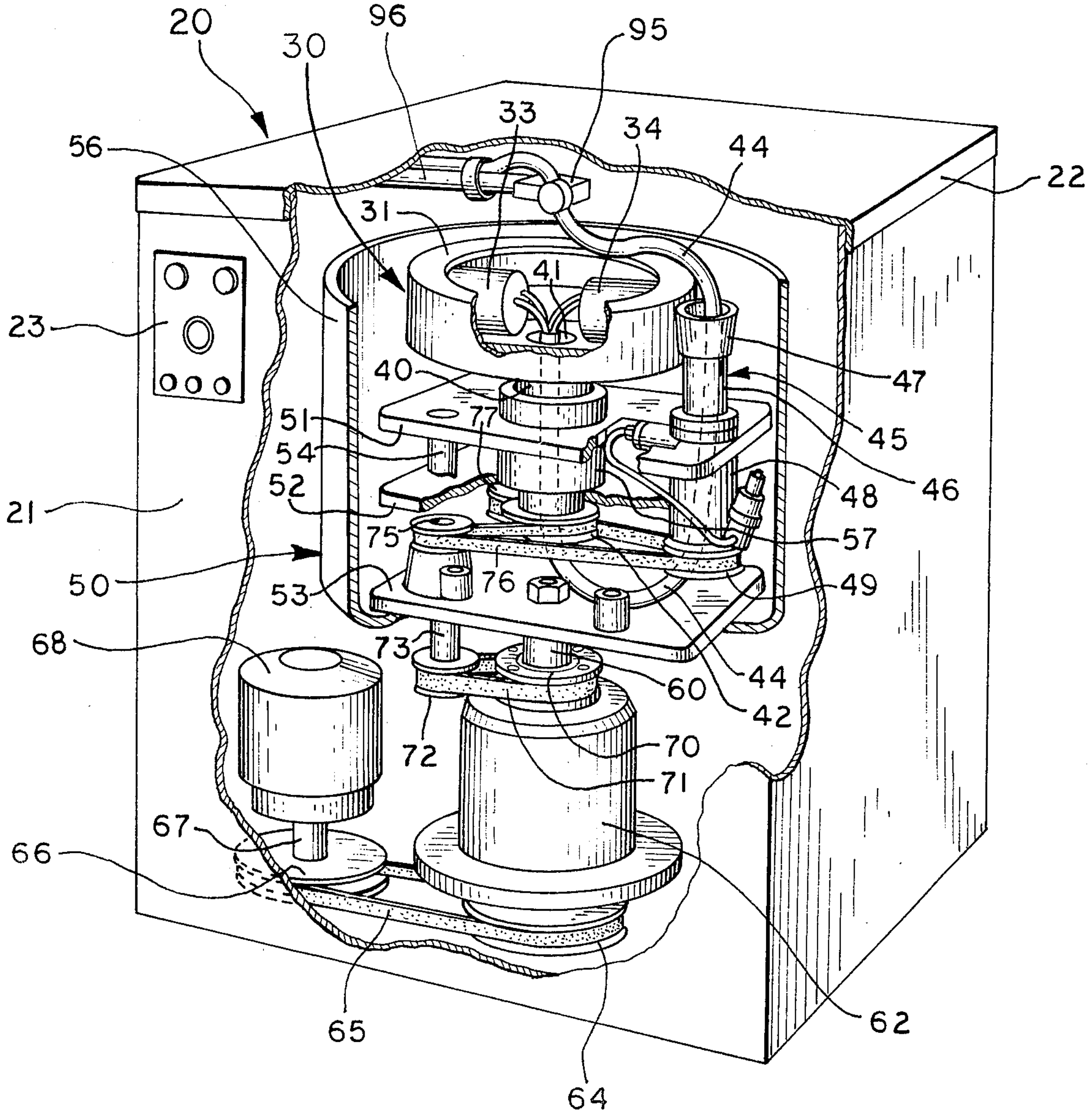
FIG. 1 is a perspective view of a centrifugal cell processing apparatus incorporating a lubrication system constructed in accordance with the invention, the processing apparatus being partially broken away to show its rotor and rotor drive assemblies, centrifugating wash bags, umbilical cable, planetary umbilicable cable guide assembly and guide assembly lubrication system.
Figure 2:
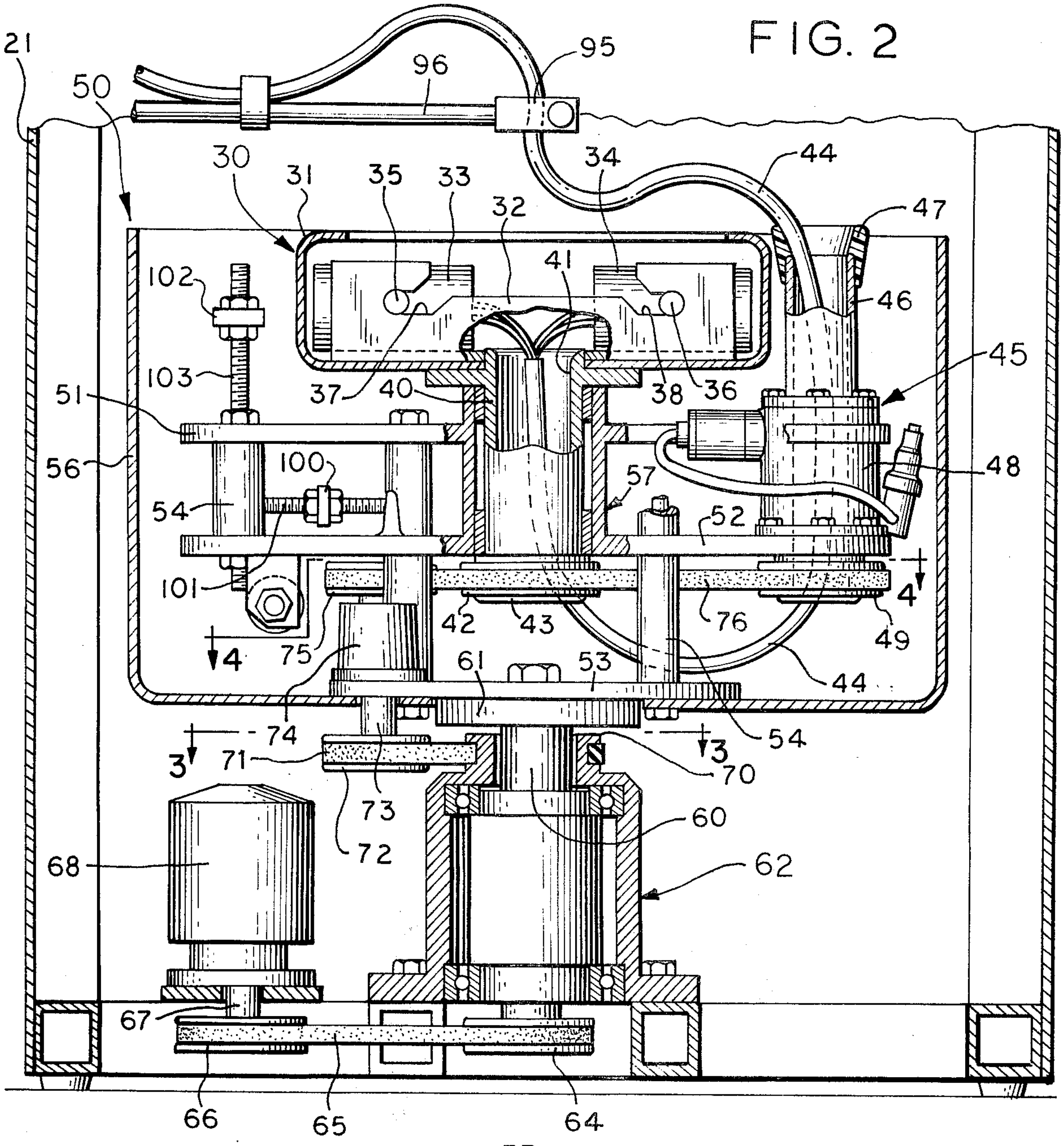
FIG. 2 is a front elevational view of the cell processing apparatus of FIG. 1 partially in cross-section and partially broken away to show the details of the rotor and rotor drive assemblies.

Referring to the figures, and particularly to FIGS. 1 and 2, a drive system constructed in accordance with the invention is shown in conjunction with a centrifugal liquid processing apparatus 20 adapted for processing glycerolized red blood cells. The red blood cell processing apparatus, which is preferably constructed in accordance with the apparatus described and claimed in the afore-identified copending application of Houshang Lolachi, Ser. No. 657,187, includes a cabinet or housing 21 which may be suitably insulated and lined to permit refrigeration of its interior. A hinged cover 22 provides access to the interior and a control panel 23 facilitates operator control of the operation of the apparatus.

The red blood cell mass to be processed is subjected to centrifugal force by means of a rotor assembly 30 which includes a bowl-shaped wind shield 31 for reducing wind friction, a central support bracket 32 (FIG. 2), and a pair of cylindrical support cups 33 and 34 in which the wash bags are contained. Cups 33 and 34, which are preferably machined of aluminum or stainless steel, are mounted in diametrically opposed positions on bracket 32 by means of opposed pairs of integral outwardly projecting pins 35 and 36 which engage respective ones of complementarily dimensioned slots 37 and 38 on bracket 32. Bracket 32 is attached at its center to the flanged upper end of a hollow vertically-aligned rotor drive shaft 40, which includes a central aperture 41 for accommodating an umbilical cable 44 which connects with the blood processing bags contained in cups 33 and 34. The bottom end of drive shaft 40 is fitted with a rotor drive pulley 42 and a free-rotating fairing 43.

The cell processing apparatus 20 further includes a rotor drive assembly 50 which includes three horizontal plate-like members 51, 52 and 53 held in a parallel spaced-apart configuration by a plurality of vertical spacers 54 and bolts 55, and a bowl-shaped wind shield 56, which is attached to the bottom surface of plate 53 and opens upwardly so as to encompass rotor assembly 30. Rotor assembly 30 is journaled to rotor drive assembly 50 by means of a vertical bearing or hub assembly 57 which extends between plates 51 and 52 and receives the rotor drive shaft 40.

In connecting with the exterior of apparatus 20 umbilical cable 44 passes through a planetary guide assembly 45. This guide assembly includes a hollow vertically-aligned guide tube 46 fitted with a fairing cap 47 at its top end, is journaled to plate members 51 and 52 by means of a bearing assembly 48. The bottom end of guide tube 46 is fitted with a drive pulley 49.

The rotor drive assembly 50 is journaled to the machine frame for rotation along the same axis as rotor assembly 30 by means of a vertical drive shaft 60 attached to plate 53 in axial alignment with rotor drive shaft 40 by means of a flange 61. Drive shaft 60 extends downwardly to a hub assembly 62, wherein a plurality of bearings 63 are provided for lateral and vertical support.

Figure 3:
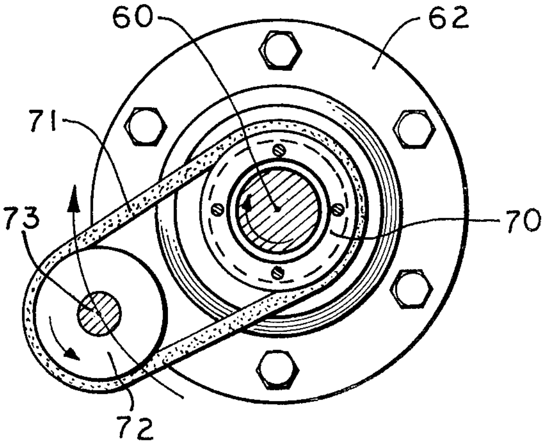
FIG. 3 is a cross-sectional view taken along line 3—3 of FIG. 2 showing the drive belt arrangement provided for the rotor drive assembly.
Figure 4:
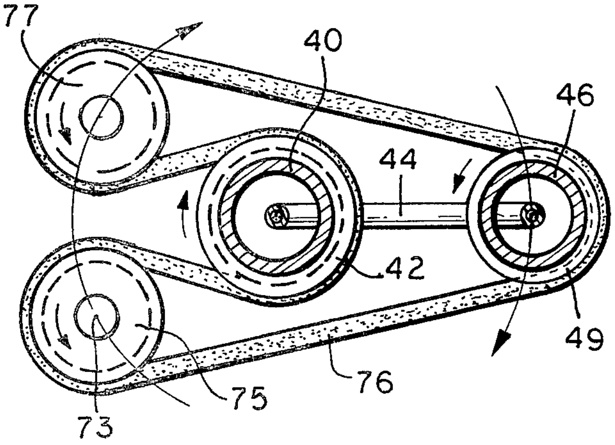
FIG. 4 is a cross-sectional view taken along line 4—4 of FIG. 2 showing the drive belt arrangement provided for the rotor assembly.

In accordance with the invention, drive power is provided to the rotor and rotor drive assemblies by means of a multiple belt drive arrangement. Referring to FIGS. 2–4, the bottom end of drive shaft 60 is fitted with a drive pulley 64. This pulley is coupled by a drive belt 65 to a motor pulley 66, which is carried on the drive shaft 67 of a conventional electric drive motor 68. To provide drive power to rotor assembly 30, the top surface of hub assembly 62 is fitted with a stationary ring-type pulley 70. As shown most clearly in FIG. 3, this pulley is coupled by a belt 71 to a lower planetary drive pulley 72, which is fitted to the bottom end of a planetary drive shaft 73, which is journaled by means of a bearing assembly 74 to the bottom plate member 53 of rotor drive assembly 50. An upper planetary drive pulley 75 is fitted to the top end of shaft 73 and, as shown most clearly in FIG. 4, this pulley is coupled by a drive belt 76 to rotor drive pulley 42 and to the drive pulley 49 of guide tube 46 with the assistance of an idler pulley 77 journaled to plate member 53.

By reason of the aforedescribed drive belt arrangements, rotor assembly 30 is caused to turn in the same direction as, and at twice the rotational speed of, rotor drive assembly 50. In the illustrated embodiment, as the rotor drive assembly 50 is turned clockwise (as viewed from above in FIGS. 3 and 4) by motor 68, planetary drive shaft 73 and upper planetary drive pulley 75 turn counterclockwise by reason of belt 71 and the stationary pulley 70. The counterclockwise rotation of pulley 75 results in clockwise rotation of rotor drive pulley 42, and hence of rotor assembly 30, by reason of the loop-back arrangement of belt 76 between these pulleys.

A 2:1 speed relationship between rotor assembly 30 and rotor drive assembly 50 is maintained by the relative diameters of the drive pulleys. Specifically, the same ratio of diameters must be maintained between pulley 70 and pulley 72 as between pulley 42 and pulley 75. This assures that the planetary drive arrangement will have a direct transfer ratio of 1:1 which, when the rotation of the planetary drive shaft 73 about the axis of rotation of drive assembly 50 is taken into account, results in an ultimate transfer ratio of 2:1. As will become evident presently, this relationship of relative speed and direction is necessary if the system is to operate without the use of rotating seals.

At the same time the planetary umbilical guide tube 46 is rotated in the opposite direction to and at one-half the speed of rotor drive shaft 40, thus establishing a planetary-like relationship with respect to the rotor axis. This is, as rotor drive assembly 50 rotates, guide tube 46 may be thought of as always facing in the same direction with respect to a stationary observer viewing the apparatus. This minimizes friction between the guide tube and umbilical cable 44.

The drive belts and pulleys utilized to drive the guide tube, rotor and rotor drive assemblies may be conventional cogged belts and pulleys of the type commonly used for timing applications where slippage is to be avoided. Drive belts 65 and 71 have cogs on their inside surfaces only, whereas drive belt 76 has cogs on both its inside and outside surfaces.

The cell washing operation is performed in a pair of wash chambers taking the form of collapsible plastic bags (not shown) contained within cups 33 and 34. These wash bags, which preferably form part of a disposable presterilized sealed flow system, the structure and operation of which is described in the afore-identified copending application of the present inventor, Ser. No. 657,186, are preferably formed with a cylindrical body portion and a conical end portion. Complementarily shaped cavities are provided in cups 33 and 34 for receiving the wash bags.

Fluid communication is established between the wash bags, which rotate with rotor assembly 30, and the non-rotating portion of the cell processing system by means of umbilical cable 44 which contains separate passageways or conduits for this purpose. As best shown in FIGS. 1 and 2, umbilical cable 44 is suspended from a point above and axially aligned with rotor assembly 30 by means of a clamp assembly 95 located at the end of a stationary support arm 96. From this point the cable extends generally downwardly and radially outwardly, passing through the center of guide tube 46, then downwardly and radially inwardly and upwardly through the hollow center of rotor drive shaft 40 to a location between cups 33 and 34, where the umbilical cable connects with inlet and the outlet tubes from the wash bags. Fairing 43, which is journaled to drive shaft 40 at its bottom end so as to rotate freely with respect thereto, serves to reduce friction between the umbilical cable 44 and the drive shaft.

The rotor drive assembly 50 is maintained in radial balance by means of a first counterbalancing weight 100 carried on a radially-aligned threaded support member 101 on plate member 52 opposite guide assembly 45. By turning weight 100 on member 101 the weight can be positioned to compensate for the weight of the guide assembly, including the weight imposed thereon by umbilical cable 44 as it passes through guide tube 46. A second counterbalancing weight 102 is carried on an axially-aligned threaded support member 103 to obtain lateral balance.

In operation, umbilical cable 44 is prevented from becoming twisted during rotation of rotor assembly 30 by the coaxial half-speed rotation of rotor drive assembly 50, which imparts a like rotation with respect to the rotor axis to the umbilical cable through guide tube 46. That is, if rotor assembly 30 is considered as having completed a first 360° rotation and rotor drive assembly 50 a 180° half-rotation in the same direction, the umbilical cable 44 will be subjected to a 180° twist in one direction about its axis. Continued rotation of rotor 30 for an additional 360° and drive assembly 50 for an additional 180° will result in umbilical cable 44 being twisted 180° in the other direction, returning the cable to its original untwisted condition. Thus, umbilical cable 44 is subjected to a continuous flecture or bending during operation of the cell processing apparatus but is never completely rotated or twisted about its own axis.

The 180° flexing of umbilical cable 44 is assisted by the planetary motion of the hollow umbilical cable guide tube 46. As the umbilical cable flexes the inside surfaces of guide 46 remain stationary with respect to the cable, minimizing friction and wear on the cable.

The drive arrangement provided by drive belts 65, 71 and 76 and the pulleys associated with these belts is particularly well suited to centrifugal apparatus 20 since the necessary drive functions are obtained with minimum complication of the apparatus. Furthermore, the drive belts add minimum weight to the apparatus and are inexpensive to service and replace.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim as our invention:

1. A drive system for a rotating terminal comprising, in combination:

a stationary base;

a rotor drive assembly rotatably mounted to said base for rotation along a predetermined axis, said rotor drive assembly including a planetary drive pulley rotatably coupled to said base so as to rotate with rotation of said rotor drive assembly, and an idler pulley;

a rotor assembly including at least one rotating terminal, said rotor assembly being rotatably mounted with respect to said base for rotation along said axis and including a rotor drive pulley;

means including a flexible umbilical cable segment for establishing energy communication with said terminal, one end of said cable segment being fixed with respect to said base along said axis at one side of said rotor assembly, the other end of said cable segment being attached on said axis in rotationally locked engagement to the other side of said rotor assembly;

guide means including a sleeve carried on and rotatably mounted to said rotor drive assembly for causing said umbilical cable segment to rotate about said axis with said rotor drive assembly, said sleeve including a sleeve drive pulley;

apparatus drive means for rotating said rotor drive assembly with respect to said base; and rotor drive means including a drive belt extending between and rotatably coupling said planetary drive pulley, said rotor drive pulley, said idler pulley, and said sleeve drive pulley for rotating said rotor assembly in the same direction as said rotor drive assembly with a speed ratio of 2:1 and said sleeve in an opposite direction with a speed equal to that of said rotor drive assembly to prevent said umbilical cable from becoming twisted during rotation of said rotor.

2. A drive system as defined in claim 1 wherein said planetary drive pulley, said idler pulley, and said sleeve drive pulley co-act with the inside surface of said drive belt and said rotor drive pulley co-acts with the outside surface of said drive belt.

3. A drive system as defined in claim 2 wherein said rotor drive pulley is centered on the axis of said rotor drive assembly, and said planetary drive and idler pulleys are disposed on the opposite side of said rotor drive assembly from that of said sleeve drive pulley.

4. A drive system as defined in claim 3 wherein said sleeve drive pulley lies on a line extending through said rotor drive pulley and perpendicular to a line joining said planetary drive and idler pulleys.

5. In a drive system for a rotating terminal of the type comprising a stationary base;

a rotor drive assembly rotatably mounted to said base for rotation along a predetermined axis, said rotor drive assembly including a planetary drive pulley rotatably coupled to said base so as to rotate with rotation of said rotor drive assembly, and an idler pulley;

a rotor assembly including at least one rotating terminal, said rotor assembly being rotatably mounted with respect to said base for rotation along said axis and including a rotor drive pulley;

means including a flexible umbilical cable segment for establishing energy communication with said terminal one end of said cable segment being fixed with respect to said base along said axis at one side of said rotor assembly, the other end of said cable segment being attached on said axis in rotationally locked engagement to the other side of said rotor assembly;

guide means including a sleeve carried on and rotatably mounted to said rotor drive assembly for causing said umbilical cable segment to rotate about said axis with said rotor drive assembly, said sleeve including a sleeve drive pulley; and apparatus drive means for rotating said rotor drive assembly with respect to said base;

the improvement comprising:

rotor drive means including a drive belt extending between and rotatably coupling said planetary drive pulley, said rotor drive pulley, said idler pulley, and said sleeve drive pulley for rotating said rotor assembly in the same direction as said rotor drive assembly with a speed ratio of 2:1 and said sleeve in an opposite direction with a speed equal to that of said rotor drive assembly to prevent said umbilical cable from becoming twisted during rotation of said rotor.

6. A drive system as defined in claim 5 wherein said planetary drive pulley, said idler pulley, and said sleeve drive pulley co-act with the inside surface of said drive belt and said rotor drive pulley co-acts with the outside surface of said drive belt.

7. A drive system as defined in claim 6 wherein said rotor drive pulley is centered on the axis of said rotor drive assembly, and said planetary drive and idler pulleys are disposed on the opposite side of said rotor drive assembly from that of said sleeve drive pulley.

8. A drive system as defined in claim 3 wherein said sleeve drive pulley lies on a line extending through said rotor drive pulley and perpendicular to a line joining said planetary drive and idler pulleys.

* * * * *